United States Patent [19]

Omiya et al.

[11] 4,168,835

[45] Sep. 25, 1979

[54] DEVICE FOR LOADING A RECORDING DISC IN A RECORDING REPRODUCING APPARATUS

[75] Inventors: Shoji Omiya, Shijonawate; Toshio Yoshimatsu, Neyagawa; Tadashi Nagaoka, Nishinomiya, all of Japan

[73] Assignee: Matsushita Electric Industrial Co., Ltd., Osaka, Japan

[21] Appl. No.: 818,868

[22] Filed: Jul. 25, 1977

[30] Foreign Application Priority Data

Aug. 9, 1976 [JP] Japan .................................. 51/95282
Sep. 24, 1976 [JP] Japan ................................ 51/115279
Dec. 17, 1976 [JP] Japan ......................... 51/169493[U]

[51] Int. Cl.² ...................... G11B 25/04; G11B 23/02
[52] U.S. Cl. .................................... 274/9 B; 358/128; 360/133
[58] Field of Search ........................ 274/9 B; 358/128; 360/86, 99, 133, 135

[56] References Cited

U.S. PATENT DOCUMENTS

| 3,800,325 | 3/1974 | O'Brien | 360/133 |
| 3,899,794 | 8/1975 | Brown | 360/86 |
| 3,975,768 | 8/1976 | Jacques et al. | 360/133 |
| 4,057,840 | 11/1977 | Wingo | 360/99 |

*Primary Examiner*—Steven L. Stephan
*Attorney, Agent, or Firm*—Stevens, Davis, Miller & Mosher

[57] ABSTRACT

The disclosure is concerned with a housing for a recording disc and a device for inserting the housing accommodating a recording disc on a recording/reproducing apparatus thereby avoiding direct contact of the operator's hand with the recording disc. The housing has a carrier or base plate for carrying the recording disc and a flexible cover fixed at one end to the carrier plate, the cover being adapted to cover the recording disc mounted on the carrier plate. The arrangement is such that the flexible cover is automatically taken off the carrier plate during insertion of the housing to bring the recording disc to its recording/reproducing position.

8 Claims, 34 Drawing Figures

DEVICE FOR LOADING A RECORDING DISC IN A RECORDING REPRODUCING APPARATUS

BACKGROUND OF THE INVENTION

The present invention relates to a recording and reproducing device adapted for recording or reproducing signals by positioning a signal transducing element in the vicinity of or in direct contact with a disc-shaped rotary recording medium.

More particularly, the invention is concerned with a recording and reproducing device so constructed as to allow free insertion and withdrawal of the disc-shaped recording medium together with its protective housing, to and from the recording/reproducing device.

Hitherto, there have been proposed various types of recording/reproducing devices for disc-shaped recording mediums: e.g. mechanically recorded mediums such as acoustic records having time signal recording grooves, magnetically recorded mediums and optically recorded mediums.

Recently, in order to cope with the increasing demand for recording and reproducing high frequency video signals, the recording mediums are required to have relatively high density signals recorded thereon. In these recording mediums carrying the densely recorded signals, even a fine scratch, fine dust, or other contaminations badly influences the reproduction of the signals.

Therefore, there is a strict requirement to handle the recording discs with the greatest care, and the insertion and withdrawal of the recording disc to and from the recording/reproducing device has to be made without direct contact from the operator's hand to the recording medium, otherwise a substantial problem is presented.

The present invention is designed to overcome the above described problems of the prior art so as to provide a device for inserting and withdrawing the disc-shaped recording medium to and from the recording/reproducing device.

To this end, according to the invention, there is provided in a recording and reproducing device a device for inserting and withdrawing a disc-shaped recording medium together with a protective housing having a carrier plate adapted to carry the recording medium and a flexible cover which covers the recording medium, comprising means for guiding the carrier plate to a recording/reproducing position where the recording/reproducing is performed, means for taking said flexible cover off said carrier plate when said housing is transferred to said recording/reproducing position, and means for clamping the recording medium in said housing which has been moved to said recording/reproducing position.

The above and other objects, as well as advantageous features of the invention will become clear from the following description of the preferred embodiment taken in conjunction with the attached drawings in which:

DESCRIPTION OF THE PREFERRED EMBODIMENTS

Figure 1:
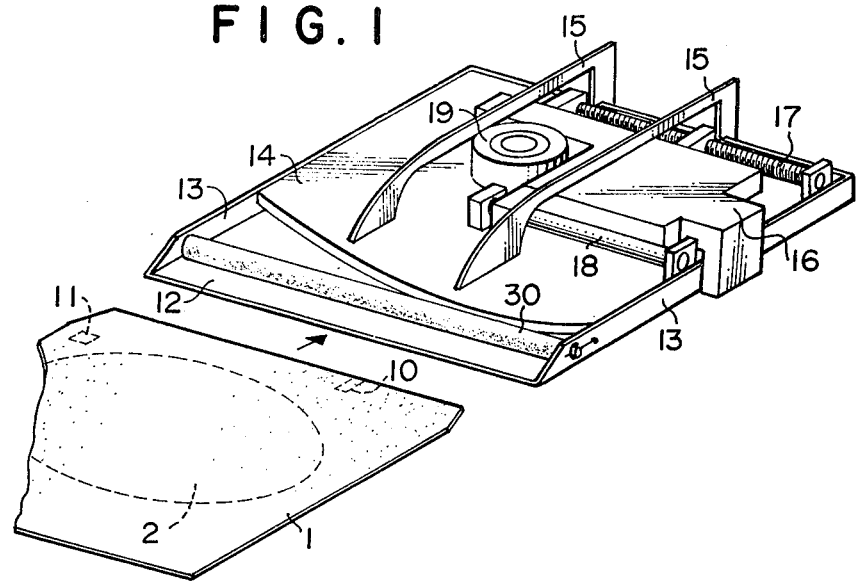
FIG. 1 is a perspective view of an embodiment of the invention.
Figure 3A:
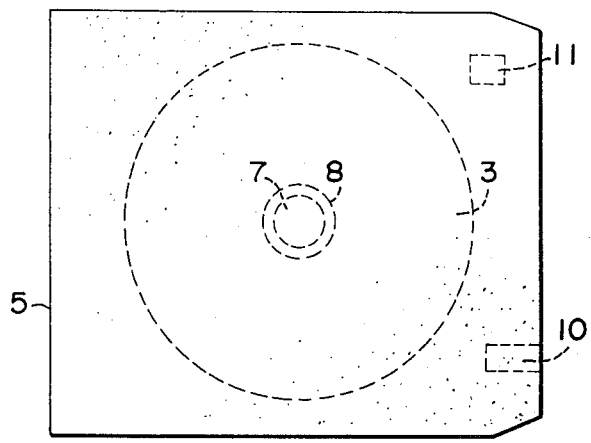
FIG. 3a and FIG. 3b are plan view and a sectional view of a housing incorporated in the device of the invention, respectively.
Figure 3B:
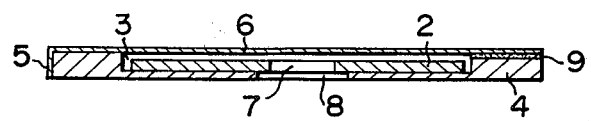

Referring at first to FIGS. 1, 3A and 3B a housing 1 for a disc-shaped recording medium 2 includes a rigid carrier plate 4 having a recess provided in its central portion as denoted by numeral 3 for receiving the recording medium 2. The housing 1 further comprises a flexible cover 6 fixed at its one end 5 to the carrier plate 4.

The carrier plate 4 is provided with a through bore 8 in a portion corresponding to the attaching bore 7 of the recording disc 2. The carrier plate 4 is coated on one side portion receiving the flexible cover 6 with a layer 9 of adhesive which may be spray adhesive 55 available from Sumitomo 3M Company, Ltd., so that the flexible cover 6 may be closely held on the carrier plate 4 when pressed onto the latter and may be separated therefrom, repeatedly, as required.

The carrier plate 4 further has a notched portion 10 in its one end portion remote from the fixed end of the flexible cover 6. A through bore 11 is formed in the vicinity of the same end. As will be clearly understood from FIG. 4, the adhesive layer 9 is so arranged as to have a larger area in the portion of the carrier plate 4 around the notched portion 10. Next an explanation will be made concerning a device for inserting and withdrawing the recording medium together with the housing 1.

A bottom plate 12 (FIGS. 1,2) has limiting plates 13 for guiding the carrier plate 4, while a stabilizing plate 14 is spaced from the bottom plate 12 by a predetermined distance. Guide plates 15 for the flexible cover 6 are provided on the upper surface of the stabilizing plate 14.

A signal-detecting unit 16 carrying a signal-detecting element has one side engaged with a feed screw rod 17, and the other side slidably engaged with a slide shaft 18 which extends in parallel with the feed screw rod 17. The arrangement is such that the unit 16 slidingly moves along the slide shaft 18, as the feed screw rod 17 is rotated by suitable driving means not shown.

Referring to FIGS. 10–13, a turn table 20 is adapted to be driven by a motor 19, and is so positioned as to slightly project out from the surface of the stabilizing plate 14.

Figure 4:
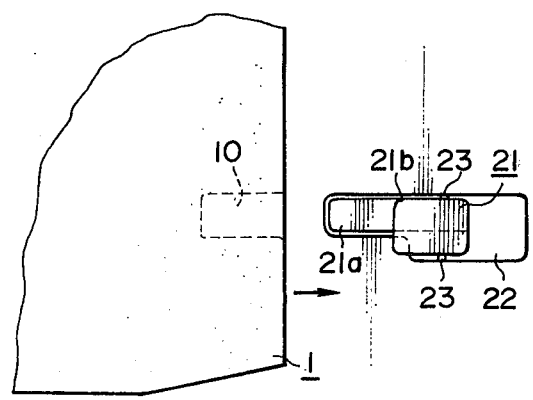
FIG. 4 is a plan view of an essential part of the embodiment as shown in FIG. 1, FIGS. 5 to 13 are sectional views of essential parts of the embodiment of FIG. 1.

As shown in FIG. 4, a cover separating member 21 is rotatably secured by a shaft 23 in a through bore 22 formed in the bottom plate 12.

Figure 5:
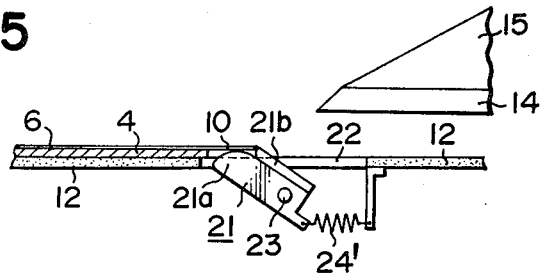

As will be seen from FIGS. 4 and 5, the cover separating member 21 has a projecting tab portion 21a having a width smaller than that of the notched portion 10 in the carrier plate 4, and an enlarged stepped portion 21b which has a width larger than that of the notched portion 10 and which projects outwardly from the top of the tab portion 21a to form a step as clearly shown in FIG. 5. The cover separating member 21 is, as a whole, normally counter-clockwise biased by means of a spring 24'. Thus, in the normal state, the rotation of the cover separating member 21 is limited in such a way that the enlarged stepped portion 21b abuts against the bottom plate 12.

Figure 2:
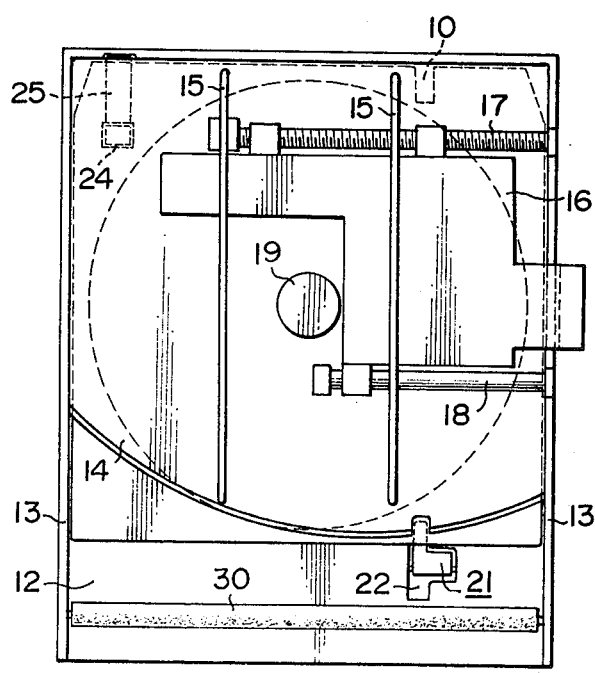
FIG. 2 is a plan view of the embodiment as shown in FIG. 1.
Figure 7:
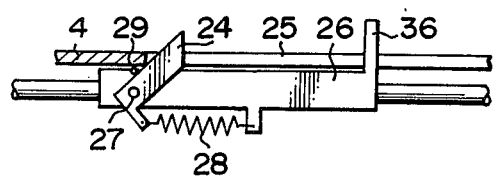

A depressable member 24 is rotatably mounted and adapted to be moved along a bore 25 formed in the end of the bottom plate 12, as shown in FIGS. 2 and 7.

More specifically, the depressable member 24 is mounted rotatably, by a shaft 27 to a carriage 26 which is adapted to be slidingly moved by a suitable driving means such as a plunger or the like (not shown).

A stopper pin 29 is provided for limiting the rotation of the depressable member 24 to a position where the end of the depressable member 24 projects upward of the bore 25 in the bottom plate 12.

In operation, when the housing 1 accommodating therein the recording medium 2 is inserted into the device beneath a rotary roller 30, as shown in FIG. 1, the carrier plate of the housing 1 comes into contact with the enlarged stepped portion 21b of the cover separating member 21, as shown in FIG. 5.

Figure 6:
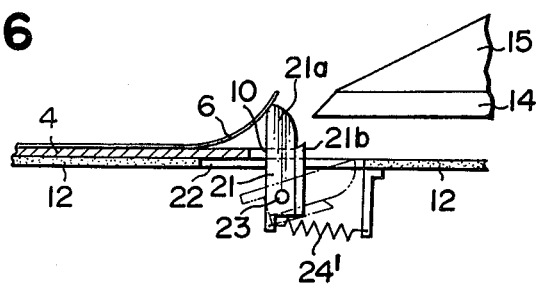

As the housing 1 is further inserted, the cover separating member 21 is rotated clockwise against the biasing force exerted by the spring 24', as shown in FIG. 6. The rotation of the cover separating member 21 causes the tab portion 21a of the cover separating member 21 to raise the cover from the notched portion 10 of the carrier plate 4 so that the cover is partially separated at its end from the carrier plate 4 (See FIG. 6).

As the housing 1 is further inserted, the cover separating member 21 comes down below the level of the bottom plate 12, as shown by broken line in FIG. 6, and the end of the flexible cover 6 separated from the carrier plate 4 comes to engage with the guide plate 15. Then, the cover 6 is moved along the guide plates 15.

As the housing 1 is inserted still further, the leading end of the carrier plate 4 comes into contact with the depressable member 24 so as to rotate and depress the latter against the biasing force of the spring 28, as shown in FIG. 7.

Figure 8:
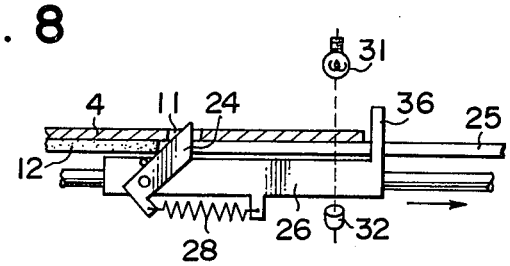

A still further insertion of the housing 1 brings the bore 11 of the carrier plate 4 into engagement with the depressable member 24, as will be seen from FIG. 8.

Figure 10:
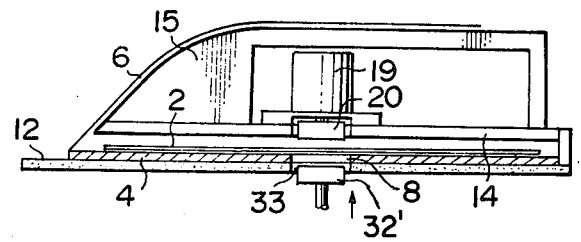

This engagement of the depressable member 24 with the bore 11 is detected by means of a detecting device, for example, a combination of a light source 31 and a photoelectric element 32 adapted to detect the insertion of the carrier plate 4 near to its recording position. Then, driving means (not shown) consisting of a plunger or the like is actuated to move the carriage 26 in the direction of the arrow, causing a fast pulling of the carrier plate 4 to the recording position. In such a condition that the carrier plate 4 has been led to the recording position, as shown in FIG. 10, driving means (not shown) are actuated to raise clamping means 32', through a bore 33 formed in the bottom plate 12 and the bore 8 formed in the carrier plate 4 so as to press the recording disc onto the turn-table 20 as shown in FIGS. 10 and 11.

Figure 11:
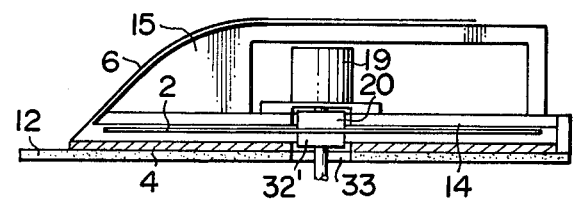

Then, as the turn-table 20 is driven the recording disc 2 is also rotated along the under surface of the stabilizing plate 14 so as to become flattened, as shown in FIG. 11.

Figure 13:
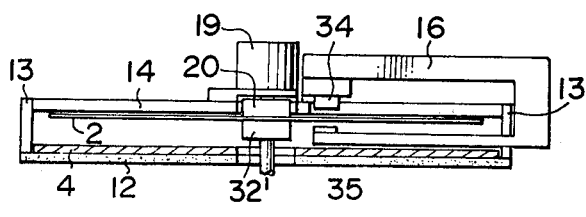

Finally, the signal-detecting unit 16 is suitably moved, so that the recorded signals in the disc 2 may be optically reproduced by a combination of a light source 34 which may be a laser beam source and a photoelectric element 35 as shown in FIG. 13.

When the reproduction comes to a stop, the signal-detecting unit 16 is returned until its light source 34 and the photoelectric element 35 are brought out of the diameter of the recording disc 2, and the clamping means 32' are lowered to allow the recording disc 2 to fall onto the carrier plate 4.

Figure 9:
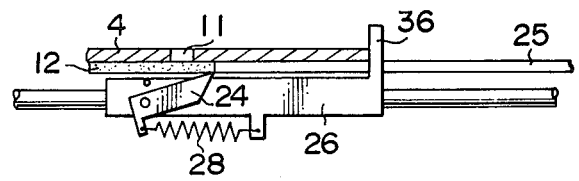

Subsequently, the carriage 26 is moved in the reverse direction of the arrow of FIG. 8 to the position as shown in FIG. 9 so that the projection 36 formed on the carriage 26 drives the carrier plate 4 away from the recording position. At the same time, the depressable member 24 comes to engage with the end of the bore 25, and is depressed down to a level below the bottom plate 12. The depressable member 24 is therefore disengaged from the bore 11 of the carrier plate 4.

Then, the carrier plate 4 can be gradually withdrawn, as it is pulled at its end. During this withdrawal, rollers 30 and 39 cooperate with each other so as to press the flexible cover 6 onto the carrier plate 4. Therefore, the flexible cover 6 is firmly held on the carrier plate 4, so as to form an adjust-free housing which has been taken out from the recording/reproducing device.

It will be seen from the foregoing description that the insertion and withdrawal of the recording disc to and from the recording/reproducing device can be made without the direct contact of the operator's hand to the record disc.

Figure 14:
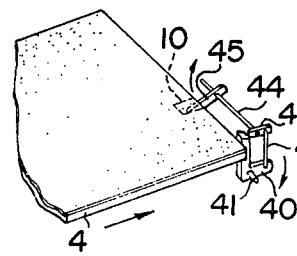
FIG. 14 is a perspective view of an essential part of another embodiment of the invention.
Figure 15:
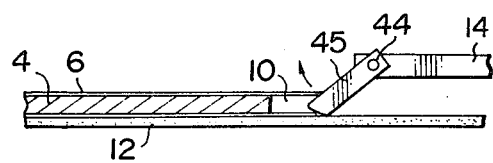
FIGS. 15 and 16 are sectional side elevational views of essential parts of the embodiment as shown in FIG. 14, FIGS. 17 to 20 are sectional side elevational views of essential parts of still another embodiment of the invention.
Figure 16:
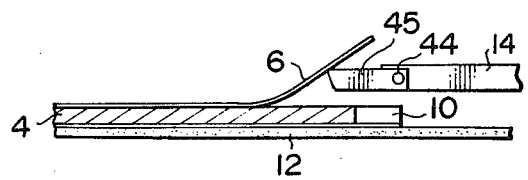

FIGS. 14–16 show the important portion of another embodiment of a cover separating member, and, in these drawings, parts which are like those of the aforementioned embodiments are represented by the same reference numerals.

Reference numeral 40 represents an L-shaped lever provided on a bottom plate 12 so that it is rotatable around a fulcrum shaft 41, and this lever 40 is adapted to be engaged with an inserted base plate 4 and rotated to 90°. The rotary movement of the lever 40 is transmitted to an interlocking arm 43 via a connecting member 42 to rotate a shaft 44 fastened to an interlocking arm 43.

Shaft 44 is provided with a separating nail 45, which is rotated by the rotary movement of the shaft 44 from the position as shown in FIG. 15 to the position as shown in FIG. 16.

Namely, the separating nail 45 is normally directed in the downward direction as shown in FIGS. 14 and 15 and positioned so that the separating nail 45 is opposite to a notched portion 10 of a housing 1. When the front end of separating nail 45 is engaged with the notched portion 10, the front end of the base plate 4 pushes the lever 40 to rotate the separating nail 45 so as to separate a cover 6 from the carrier plate 4 as shown in FIG. 16, then the cover thus separated is led to the guide plates 15. This separating means is conveniently used for separating a cover of a housing in which two recording mediums are carried on both sides of the base plate, which will be described later.

FIGS. 17-20 shows still another embodiment of the separating member. Reference numeral 50 represents a rubber sucker which is so constructed as to open, as necessary, an air hole by a means not shown.

This sucker 50 is provided at the free end of an arm 52 which is rotated around a shaft 51.

Figure 18:
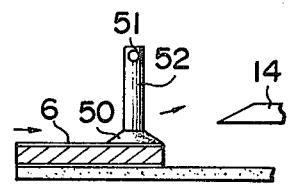
Figure 19:
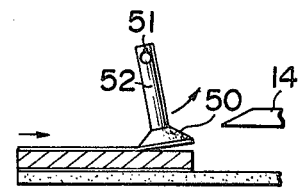
Figure 20:
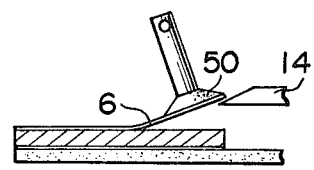

In this structure when the housing is inserted in the direction of the arrow, the housing is then pushed onto the bottom plate 12 by the sucker 50 as shown in FIG. 18 so that the sucker 50 is absorbed on cover 6. When the insertion of the housing is further progressed, the cover 6 and the carrier plate 4 are separated from each other as shown in FIGS. 19 and 20. When the air hole of the sucker 50 is opened upon the condition as shown in FIG. 20, the cover 6 is received on a stabilizing plate 14, and the cover 6 is thereafter guided upwardly along the guide plate 15.

Now, another embodiment of the housing will be shown in FIG. 21.

In this embodiment, two recording discs 2, 2' are symetrically loaded to the upper and the lower surfaces of the base plate 4, respectively. A cover 6', a notched portion 10', and the through bore 11' are provided in the positions which the cover 6, the notched portion 10 and the through bore 11 will respectively take when the housing 1 is turned upside down (refer to FIG. 3).

Figure 21A:
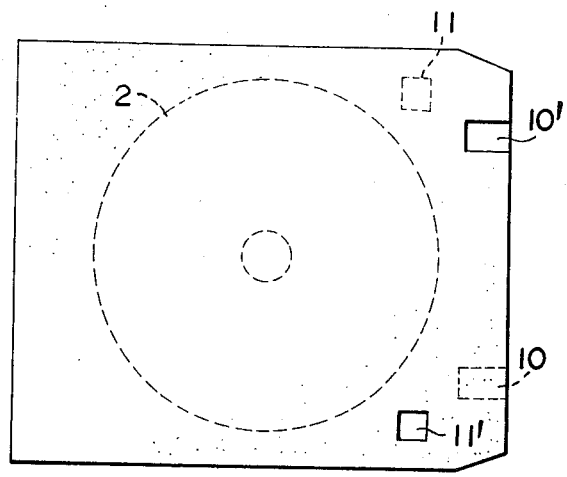
FIGS. 21a, 21b and 21c are a plan view, a sectional view and a perspective view of another example of the housing for the recording medium incorporated in the device of the invention.
Figure 21B:
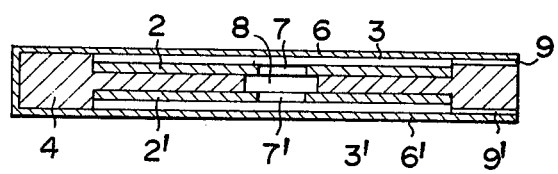
Figure 21C:
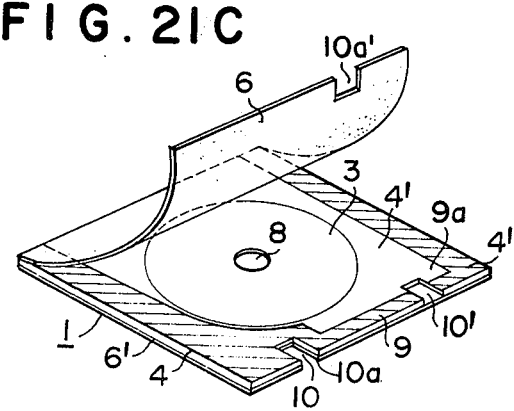

In this embodiment, as clearly shown in FIG. 21c it is necessary that the covers 6, 6' are provided with the notched portions 10a, 10a' through which a cover separating member as shown in FIG. 5 is introduced.

Figure 17:
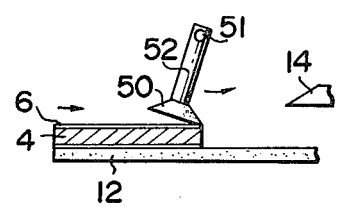

In this embodiment, the cover separating operation through the insertion of the housing can be performed by the same separating member as shown in FIGS. 14 and 17, and the clamping means as described above cannot be used in this embodiment since two recording discs are disposed in the upper and lower surfaces of the base plates.

Figure 22:
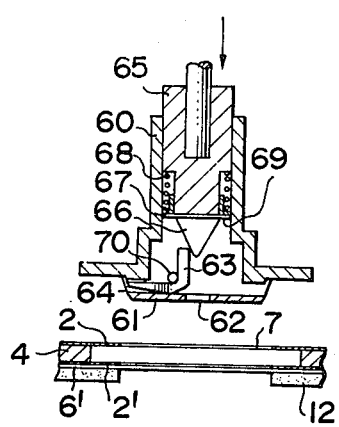
FIGS. 22 to 24 are sectional side elevational view of still another embodiment of the invention.
Figure 23:
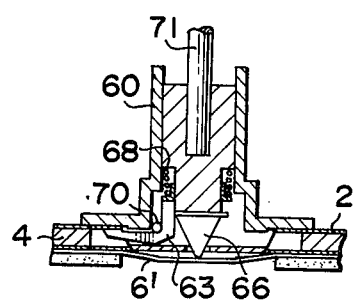
Figure 24:
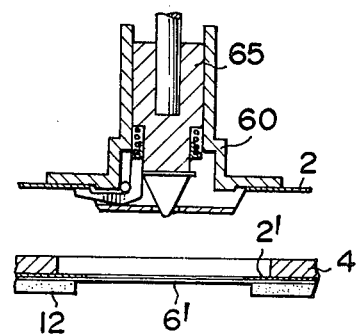

An embodiment of clamping means suitable to the embodiment as shown in FIGS. 21A, 21B and 21C is shown in FIGS. 22-24.

Reference numeral 60 represents a main body of clamping means having an opening portion at the lower end thereof, and a guide member 61 is provided so that it covers this opening portion.

This guide member 61 is provided with a through bore 62 in the central portion thereof and has an opening 64 defined between this member 61 and the main body 60, through which opening 64 a clamping nail 63 can be made to move in and out.

Reference numeral 65 represents a plunger for actuating the clamping means which has a conical portion 66 in the lower portion thereof.

Reference numeral 67 represents a spring retaining ring which can be slidably moved with the plunger 65 in the hollow interior of the main body 60 and which is always urged by a spring 68 against a stopper 69 fitted to the plunger 65.

The clamping nail 63 is made in the shape of a letter L and has a part of its lower surface abutted to the bottom surface of the guide member 61 so that the projected portion of the clamping nail 63 is slidably moved on the bottom surface of the guide member 61. The projected portion is normally urged against the conical portion 66 by a spring 70.

When the clamping means is actuated, the main body 60 is pushed downwardly until the lower end surface comes into contact with recording disc 2, while the guide member 61 is passed through the bore 7 of the recording disc 2.

When a shaft 71 is pressed in this stage of operation, the plunger 65 alone goes down, and, with this downward movement of the plunger 65, the clamping nail 63 is driven by the conical portion 66 against the force of the spring 70 to project the end of the clamping nail 63 out of the opening 64.

When the shaft 71 is further pressed, the clamping nail is pressed by the force of the spring 68 compressed by the plunger 65. Therefore the clamping nail 63 rocks about a fulcrum point which corresponds to the portion making contact with the bottom surface of the guide member 61, and the recording disc is held between the free end of the clamping nail 63 and the main body 60 (refer to FIG. 23).

When the main body 60 is raised with the above condition being retained by a means not shown, the recording disc 2 is also raised simultaneously (refer to FIG. 24).

By rotating the clamping means main body 60 under the condition as shown in FIG. 24, the recording disc 2 is rotated.

This clamping condition can be released by returning the pressing means 65 to its original portion, that is the components concerned take the positions as illustrated in FIG. 22.

In the above embodiment, a flexible cover of the housing is adherred to a base plate through an adhesive material layer 9 between the contact surfaces thereof. But instead of layer 9 they may be bound together through adhesive tapes.

Figure 12:
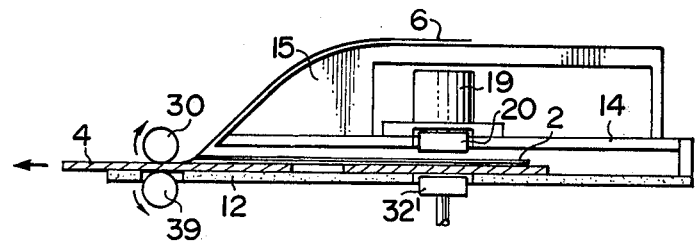

One of the rollers 30, 39 as shown in FIG. 12 is set rotatable in both directions by a motor and serve as a driving source for inserting and withdrawing the housing. It may also be used as means for pressingly binding the flexible cover to the base plate during the withdrawal of the housing.

Figure 25:
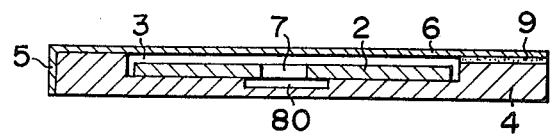
FIG. 25 is a sectional side elevational view of still another example of the housing for the recording medium incorporated in the device of the invention.
Figure 26:
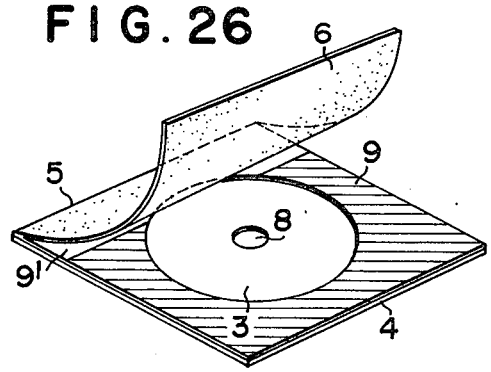
FIGS. 26 to 30 are perspective views of further examples of the housing for the recording medium incorporated in the device of the invention.

In a device wherein a clamping means as shown in FIGS. 22-24 is used, the through bore 8 provided in the carrier plate 4 of the housing may be substituted by a recess 80 having a bottom portion as shown in FIG. 25.

According to the above construction, a recording medium 2 is housed in a sealed condition so that dust does not adhere to the recording medium while it is not in use.

FIGS. 26-31 show various embodiments of the housing of the present invention wherein an adhesive material layer 9 is provided between the cover 6 and the carrier plate 4 in such a portion excepting a portion 9' which is near a joint end 5 of the cover 6 and the carrier plate 4 (refer to FIG. 25). Since the binding of the cover 6 and the carrier plate 4 in this position 9' near the joint end 5, is not similar, a smaller depressing load may be sufficient for binding the flexible cover and the carrier plate. Thus, the load provided by rollers 30, 39 can be decreased which causes the resistant load against the pulling force of the carriage 26 as shown in FIGS. 1 thru 9.

Figure 27:
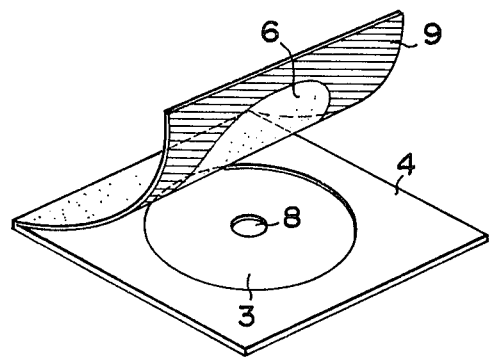
Figure 28:
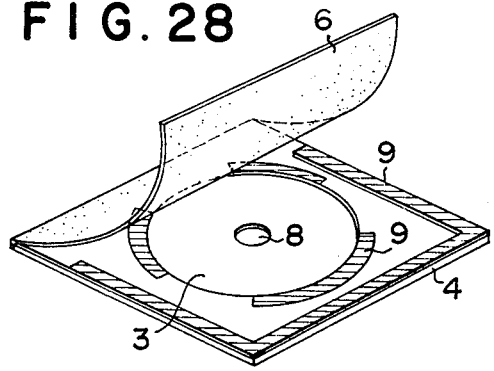

In an embodiment as shown in FIG. 27, an adhesive material layer 9 is provided on the cover 6, and, in an embodiment as shown in FIG. 28, the area of adhesive material layer 9 is reduced to facilitate the separation of the cover 6 with no decrease in sealing effect of the housing.

By disposing the adhesive material layer on the peripheral portion of the carrier plate 4, the separation of the cover 6 is effectively prevented when the housing is not used. By disposing the adhesive material layer 9 on the circumferential portion of the recess 3, the recording disc 2 is prevented from jumping out of the recess 3 when it is not in use.

Figure 29:
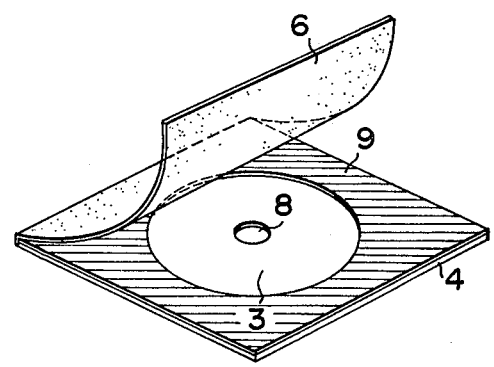
Figure 30:
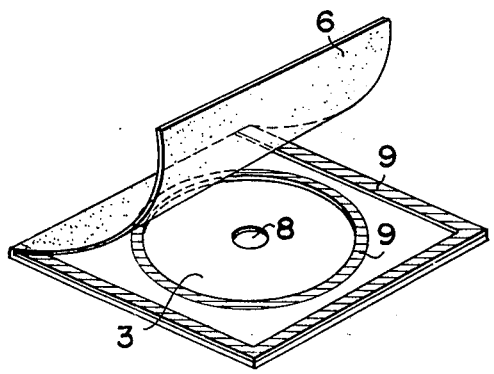

In embodiments as shown in FIGS. 29 and 30, the adhesive material layer is disposed on the entire circumferential portion of recess 3. When the recess 80 having bottom portion as shown in FIG. 25 is formed as a receiving hole of the clamping means, the recess 3 is held in a sealed condition when it is not in use, and air does not enter from out-side so that the recording medium can be stored for a long period without cleaning.

Figure 31:
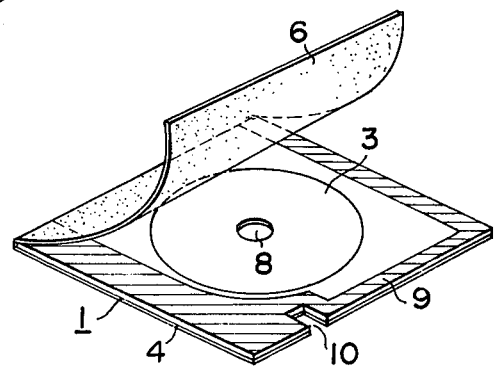

In an embodiment as shown in FIG. 31, the area of the adhesive material layer 9 is increased near the notched portion 10 in which the cover separating member is inserted. Namely, in this embodiment, the cover 6 is more firmly bound to the base plate 4 near the notched portion 10. According to the embodiment having the above-mentioned construction, the cover separation can be evenly carried out without abrupt separation.

As may be clearly noted from the above-described embodiments, according to the present invention the recording medium placed in the housing can be mounted on and removed from a recording and reproducing device without being touched by the operator's hand so as to prevent it from being damaged.

What is claimed is:

1. A housing for a recording disc, the latter defining an aperture at its center portion, comprising:
    a carrier plate having a recess portion formed in at least one of its surfaces, said recess portion being adapted to receive and support said recording disc;
    a bore formed in the center portion of said recess portion and having a larger diameter than that of the center aperture of said recording disc;
    a flexible cover secured at one of its side edges to said carrier plate and completely covering said recess portion; and,
    a releasable adhesive layer located on said carrier plate around said recess portion for securing said flexible cover to said carrier plate to releasably and sealably house the recording disc within said recess portion when said cover and plate are pressed together.

2. A housing for a recording disc according to claim 1, wherein said carrier plate is provided with a notch in one of its end portions remote from the secured side edge of said flexible cover, said notch being adapted to receive a cover separating member.

3. A housing for a recording disc according to claim 2, wherein said releasable adhesive layer is located over a larger area of said carrier plate in the vicinity of said notch than at other portions of said carrier plate.

4. A housing for a recording disc according to claim 1, wherein said releasable adhesive layer is not provided in the vicinity of that portion of said carrier plate which is secured to said cover.

5. A housing for a recording disc according to claim 1, wherein said releasable adhesive layer is annularly provided at least around said recessed portion of carrier plate to surround said recessed portion.

6. A housing for a disc-type recording medium according to claim 1, wherein said recessed portion, said bore, said releasable adhesive layer, and said cover are provided in and on both surfaces of said carrier plate.

7. A device for loading a recording disc held in a housing, said housing comprising a carrier plate carrying the recording disc on at least one side thereof, and a flexible cover having one end attached to one side surface of the carrier plate and a free end releasably secured to another side surface of said carrier plate on the front of said housing, said cover extending completely over said carrier plate and serving as a dust-free protecting cover for the recording disc when it is not in use, said device comprising:
    means for receiving an inserted housing and associated recording disc and for slidably feeding the recording disc together with the housing to a recording/reproducing position, said receiving and feeding means having laterally limiting members and a bottom plate, the under surface of the carrier plate sliding on said bottom plate and the lateral sides of the carrier plate being guided by said laterally limiting members during the feed of the recording disc and housing;
    at least one separating member rotatably disposed in an aperture defined in said bottom plate and adapted to be engaged at its free end with the free end of the flexible cover so as to take the free end of the flexible cover off the carrier plate, said separating member being raised from said bottom plate in association with the insertion of the housing into said device and being rotated approximately 180 degrees in association with the sliding movement of the housing so that the free end of said separating member finally takes a position below said bottom plate;
    means for guiding the free end of the flexible cover taken off by said separating member in association with the sliding movement of the carrier plate by said receiving and feeding means so as to completely separate the flexible cover from covering the carrier plate thereby completely exposing the surface of said recording disc;
    means for lifting the recording disc from the carrier plate when said housing is in said recording/reproducing position;
    means for rotating the recording disc lifted by said lifting means; and
    means positioned above said carrier plate when it is in said recording/reproducing position for recording or reproducing signals from or onto the recording disc.

8. A device for loading a recording disc as set forth in claim 7, wherein said lifting means is arranged above the inserted recording disc and comprises a rotatable hollow cylinder which moves to and from the recording disc, and which is adapted to make contact with an associated area of the recording disc when said hollow cylinder has moved to the recording disc, and which further comprises clamping means disposed in said hollow cylinder, said clamping means having a clamping nail which is adapted to be inserted through an attached hole of the recording disc into a recess provided in the carrier plate, said clamping nail being movable by a positioning means to project laterally outward of said hole to underlie a portion of said recording disc and clamp the recording disc against the lower end of said hollow cylinder, when said clamping nail is inserted in the recess of the carrier plate.

* * * * *